(12) United States Patent
Guo et al.

(10) Patent No.: US 8,224,874 B2
(45) Date of Patent: *Jul. 17, 2012

(54) SYSTEMS AND METHODS FOR REMOVING UNREFERENCED DATA SEGMENTS FROM DEDUPLICATED DATA SYSTEMS

(75) Inventors: Fanglu Guo, Los Angeles, CA (US); Mark Christiaens, Aalter (BE); Weibao Wu, Vandanis Heights, MN (US)

(73) Assignee: Symantec Corporation, Mountain View, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 12/652,300

(22) Filed: Jan. 5, 2010

(65) Prior Publication Data

US 2011/0167096 A1    Jul. 7, 2011

(51) Int. Cl.
G06F 17/30    (2006.01)
(52) U.S. Cl. .............. 707/813; 707/814; 707/816
(58) Field of Classification Search ........... 707/813–816
See application file for complete search history.

(56) References Cited

U.S. PATENT DOCUMENTS

| | | | |
|---|---|---|---|
| 5,577,246 A * | 11/1996 | Priddy et al. | 1/1 |
| 6,304,880 B1 * | 10/2001 | Kishi | 1/1 |
| 6,571,260 B1 * | 5/2003 | Morris | 1/1 |
| 8,108,446 B1 * | 1/2012 | Christiaens | 707/816 |
| 2003/0033320 A1 * | 2/2003 | Houldsworth | 707/103 R |
| 2003/0177327 A1 * | 9/2003 | Baentsch et al. | 711/170 |
| 2005/0132374 A1 * | 6/2005 | Flood et al. | 718/100 |
| 2006/0173939 A1 | 8/2006 | Yin et al. | |
| 2008/0005201 A1 | 1/2008 | Ting et al. | |
| 2009/0259701 A1 | 10/2009 | Wideman et al. | |
| 2010/0211753 A1 * | 8/2010 | Ylonen | 711/165 |
| 2010/0235377 A1 * | 9/2010 | Kuryata et al. | 707/769 |

OTHER PUBLICATIONS

Sun Developer Network (SDN); Bug Database Community, Bug ID 6283488; http://bugs.sun.com/bugdatabase/view_bug.do?bug_id=6283488; Taken from site on Dec. 10, 2009.
Metadecks.org: AUBE—Sweep-Links; http://www.metadecks.org/software/sweep/news.html; Taken from site on Dec. 2, 2009.
3D2F.com Software Directory; http://3d2f.com/tags/excel/remove/duplicate/data/; Taken from site on Dec. 2, 2009.

(Continued)

*Primary Examiner* — Hanh Thai
(74) *Attorney, Agent, or Firm* — Advantedge Law Group (57) ABSTRACT

A computer-implemented method for removing unreferenced data segments from deduplicated data systems may include: 1) identifying a deduplicated data system that contains a plurality of data objects, 2) dividing the data objects within the deduplicated data system into a plurality of data object groups, 3) identifying, within the data object groups, at least one data object group that has changed subsequent to a prior garbage-collection operation that removed data segments that were not referenced by data objects within the deduplicated data system, 4) identifying at least one container within the deduplicated data system that contains data segments referenced by data objects within the changed data object group, and then, for each identified container, 5) removing data segments from the identified container that are not referenced by data objects within the deduplicated data system. Various other methods, systems, and computer-readable media are also disclosed.

20 Claims, 8 Drawing Sheets

OTHER PUBLICATIONS

Jonathan Liss; Seeking Alpha; EMC to Launch Data Deduplication for VMware; VMware Shares Surge; http://seekingalpha.com/article/46664-emc-to-launch-data-deduplication-for-vmware-vmware-shares-surge; Taken from site on Dec. 2, 2009.

Nerdnotes.org; CakePHP Email Component; http://nerdnotes.org/; Oct. 20, 2009.

International Search Report and Written Opinion received in PCT Application No. PCT/US2010/062183 on Mar. 31, 2011.

Mark Christiaens et al.; Systems and Methods for Removing Unreferenced Data Segments From Deduplicated Data Systems; Non-Final Office Action received in U.S. Appl. No. 12/652,333 on Oct. 19, 2011.

* cited by examiner

SYSTEMS AND METHODS FOR REMOVING UNREFERENCED DATA SEGMENTS FROM DEDUPLICATED DATA SYSTEMS

BACKGROUND

Deduplicated data systems are often able to reduce the amount of space required to store files by recognizing redundant data patterns. For example, a deduplicated data system may reduce the amount of space required to store similar files by dividing the files into data segments and storing only unique data segments. In this example, each deduplicated file may simply consist of a list of data segments that make up the file.

While conventional deduplicated data systems may reduce the space required to store files, the mechanisms used by such conventional systems to manage deduplicated data may present unwanted limitations. For example, since more than one file may reference any given data segment, the data segments that make up a file cannot simply all be removed when the file is deleted. In order to safely delete data segments, a deduplicated data system must distinguish between referenced and unreferenced data segments.

In some cases, conventional deduplicated data systems may use bilateral referencing systems in order to ensure that data segments are not prematurely removed. For example, each file in a conventional deduplicated data system may include a list of data segments that make up the file. Likewise, each data segment within the deduplicated data system may maintain a list that identifies each file within the system that references the data segment. In this example, the deduplicated data system may use the lists maintained by both the files and the data segments to identify unreferenced data segments (i.e., data segments that are no longer referenced by any of the files in the deduplicated data system) that may be removed from the system.

Unfortunately, the bilateral referencing systems used by many conventional deduplicated data systems suffer from a number of deficiencies. For example, when a file in a conventional deduplicated data system is updated, the system may need to update both the referential list maintained by the file and the referential list maintained by each data segment referenced by the file. The process of creating and updating two referential lists may be both time consuming and resource intensive.

In other examples, conventional deduplicated data systems may use mark-and-sweep systems in order to ensure that data segments are not prematurely removed. For example, a deduplicated data system may check each data segment to see if that data segment is referenced by any file in the deduplicated data system. In this example, if a mark-and-sweep system finds a file that includes the data segment, the mark-and-sweep system may mark the data segment as referenced. The mark-and-sweep system may then sweep the deduplicated data system for unmarked data segments and delete the unmarked data segments. Unfortunately, a brute force approach of checking each data segment may also be time consuming and resource intensive. Accordingly, the instant disclosure identifies a need for efficiently marking and sweeping unreferenced data segments in deduplicated data systems.

SUMMARY

As will be described in greater detail below, the instant disclosure generally relates to systems and methods for efficiently removing unreferenced data segments from deduplicated data systems by dividing data into groups and focusing mark-and-sweep operations on groups that have changed and which may, therefore, contain unreferenced data segments. In one example, one or more of the various systems described herein may accomplish this task by: 1) identifying a deduplicated data system that contains a plurality of data objects, 2) dividing the data objects within the deduplicated data system into a plurality of data object groups, 3) identifying, within the data object groups, at least one data object group that has changed subsequent to a prior garbage-collection operation that removed data segments that were not referenced by data objects within the deduplicated data system, 4) identifying at least one container within the deduplicated data system that contains data segments referenced by data objects within the changed data object group, and then, for each identified container, 5) removing data segments from the identified container that are not referenced by data objects within the deduplicated data system.

The division of the data objects within the deduplicated data system into data object groups may include any suitable method or criteria. In some examples, dividing the data objects into data object groups may include identifying a plurality of backups that contain the data objects and adding one or more of the backups to each data group.

Identifying one or more data object groups changed subsequent to a prior garbage-collection operation may include identifying a variety of changes, including a data object added to a data object group, a data object removed from a data object group, and/or a data object that changed within a data object group. Identifying a changed data object group may include various steps, such as monitoring the plurality of data object groups for changes.

In some examples, removing unreferenced data segments from an identified container may involve checking only identified containers for unreferenced data segments. In these examples, checking only identified containers for unreferenced data segments may entail checking only identified containers for changes that potentially dereferenced at least one data segment.

The removal of unreferenced data segments from an identified container may occur in any suitable manner. For example, removing the unreferenced data segments from the identified container may include marking each unreferenced data segment in the identified container for each changed data object group and then removing unmarked data segments from the identified container.

In some examples, marking each referenced data segment in the identified container for each changed data group may include creating a map of referenced data segments in the identified container for each changed data object group. In certain examples, marking each referenced data segment in the identified container for each changed data group may further include merging each map of referenced data segments in the identified container into a comprehensive map for the identified container.

In some embodiments, removing unmarked data segments from the identified container may include determining that at least one changed data object group experienced a change that potentially dereferenced an affected data segment in the identified container. The change that potentially dereferenced the affected data segment may include a variety of changes, such as the deletion of a data object from the changed data object group and/or the modification of a data object within the changed data object group.

As will be explained below, by focusing mark-and-sweep procedures on containers that include data segments from data objects groups that have undergone changes that could lead to unreferenced data segments, the systems and methods described herein may effectively reduce the amount of computing resources required to locate and delete unreferenced data segments.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for removing unreferenced data segments from deduplicated data systems. The phrase "deduplicated data system," as used herein, generally refers to storage systems that reduce redundant data by only storing a single instance of data (e.g., a data segment), potentially referencing each data instance multiple times. Examples of deduplicated data systems may include SYMANTEC's NETBACKUP PUREDISK. As will be described in greater detail below, a single instance of data may be referenced by a single data object (e.g., a file) or a plurality of data objects within the deduplicated data system.

Figure 1:
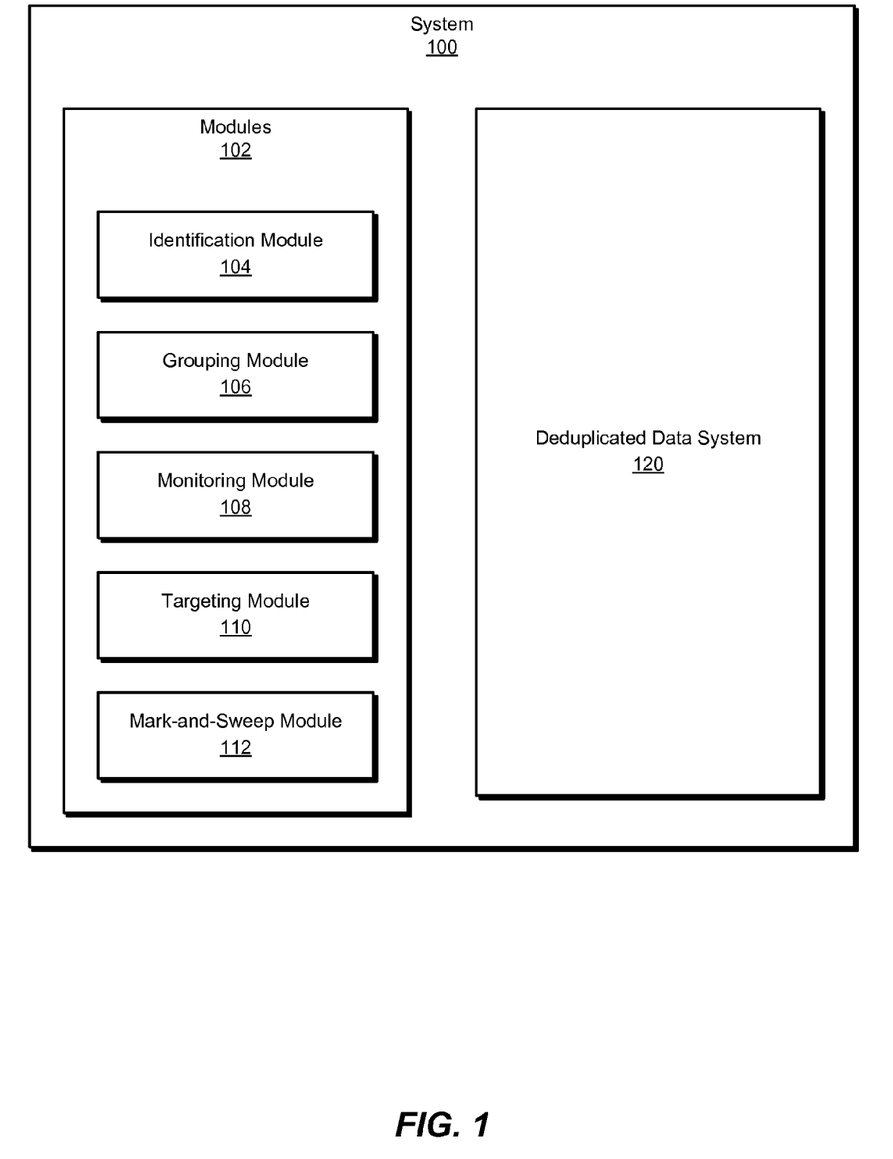
FIG. 1 is a block diagram of an exemplary system for removing unreferenced data segments from deduplicated data systems.
Figure 2:
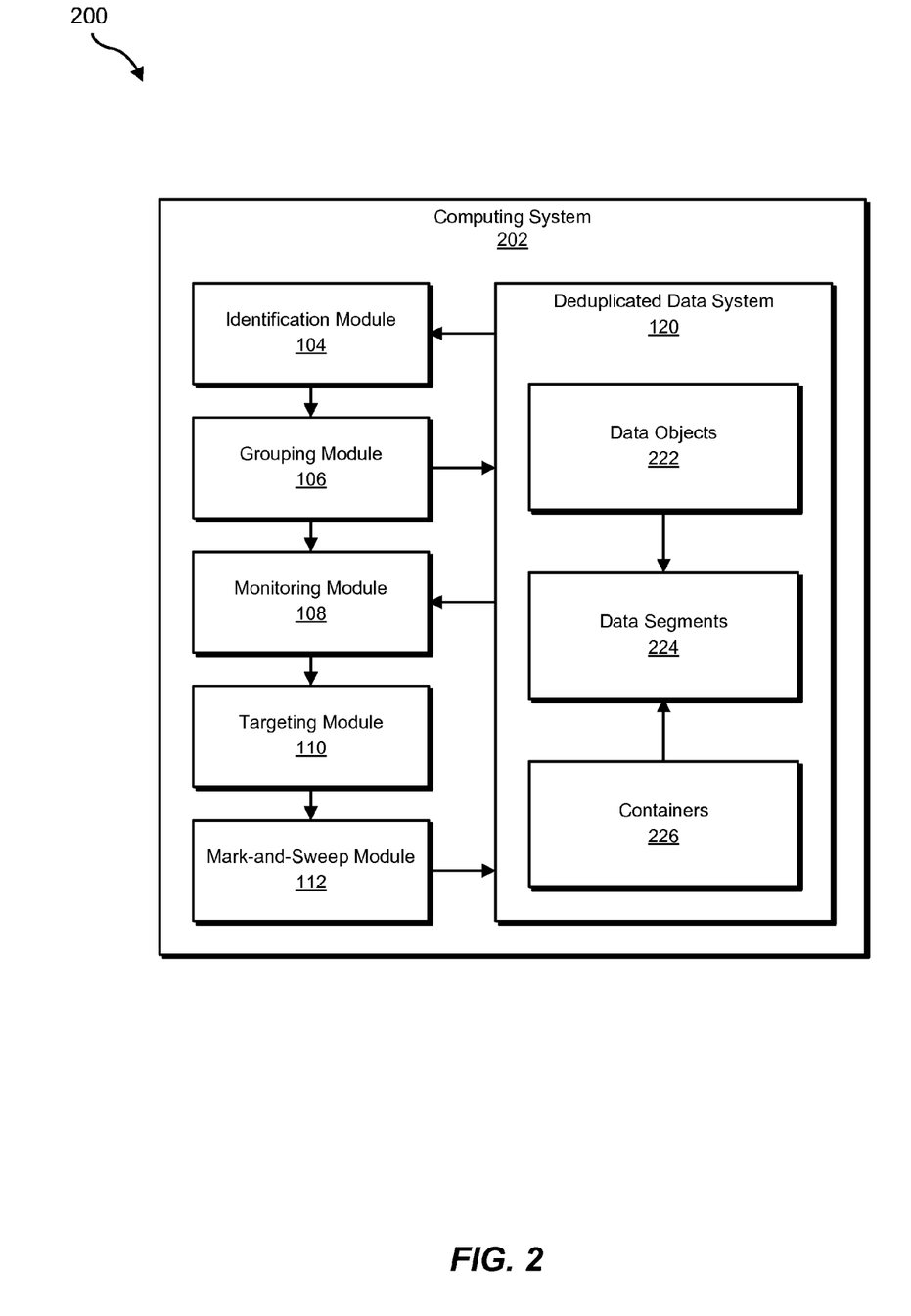
FIG. 2 is a block diagram of an exemplary system for removing unreferenced data segments from deduplicated data systems.

The following will provide, with reference to FIGS. 1-2, detailed descriptions of exemplary systems for removing unreferenced data segments from deduplicated data systems. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for removing unreferenced data segments from deduplicated data systems. As illustrated in this figure, exemplary system 100 may include one or more modules 102 for performing one or more tasks. For example, and as will be explained in greater detail below, exemplary system 100 may include an identification module 104 programmed to identify a deduplicated data system that contains a plurality of data objects. Exemplary system 100 may also include a grouping module 106 programmed to divide data objects within the deduplicated data system into a plurality of data object groups.

In addition, and as will be described in greater detail below, exemplary system 100 may include a monitoring module 108 programmed to identify, within the data object groups, at least one data object group that has changed subsequent to a prior garbage-collection operation that removed data segments that were not referenced by data objects within the deduplicated data system. Exemplary system 100 may also include a targeting module 110 programmed to identify at least one container within the deduplicated data system that contains data segments referenced by data objects within the changed data object group. Exemplary system 100 may additionally include a mark-and-sweep module 112 programmed to remove data segments from each identified container that are not referenced by data objects within the deduplicated data system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 202 in FIG. 2, computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include a deduplicated data system 120. Deduplicated data system 120 may represent portions of a single storage system or computing device or a plurality of storage systems or computing devices. For example, deduplicated data system 120 may represent a portion of computing system 202 in FIG. 2, computing system 710 in FIG. 7, and/or portions of exemplary network architecture 800 in FIG. 8. Alternatively, deduplicated data system 120 in FIG. 1 may represent one or more physically separate devices capable of being accessed by a computing device, such as computing system 710 in FIG. 7 and/or portions of exemplary network architecture 800 in FIG. 8.

Exemplary system 100 in FIG. 1 may be deployed in a variety of ways. For example, all or a portion of exemplary system 100 may represent portions of an exemplary system 200 in FIG. 2. As shown in FIG. 2, system 200 may include a computing system 202 including deduplicated data system 120 from FIG. 1. In one embodiment, and as will be described in greater detail below, modules 102 from FIG. 1 may program computing system 202 to: 1) identify a deduplicated data system (such as deduplicated system 120) that contains a plurality of data objects (such as data objects 222), 2) divide the data objects within the deduplicated data system into a plurality of data object groups, 3) identify, within the data object groups, at least one data object group that has changed subsequent to a prior garbage-collection operation that removed data segments that were not referenced by data objects within the deduplicated data system, 4) identify at least one container (e.g., from containers 226) within the deduplicated data system that contains data segments (e.g., from data segments 224) referenced by data objects within the changed data object group, and then, for each identified container, 5) remove data segments from the identified container that are not referenced by data objects within the deduplicated data system (by, e.g., deleting the unreferenced data segments within the identified container).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Figure 3:
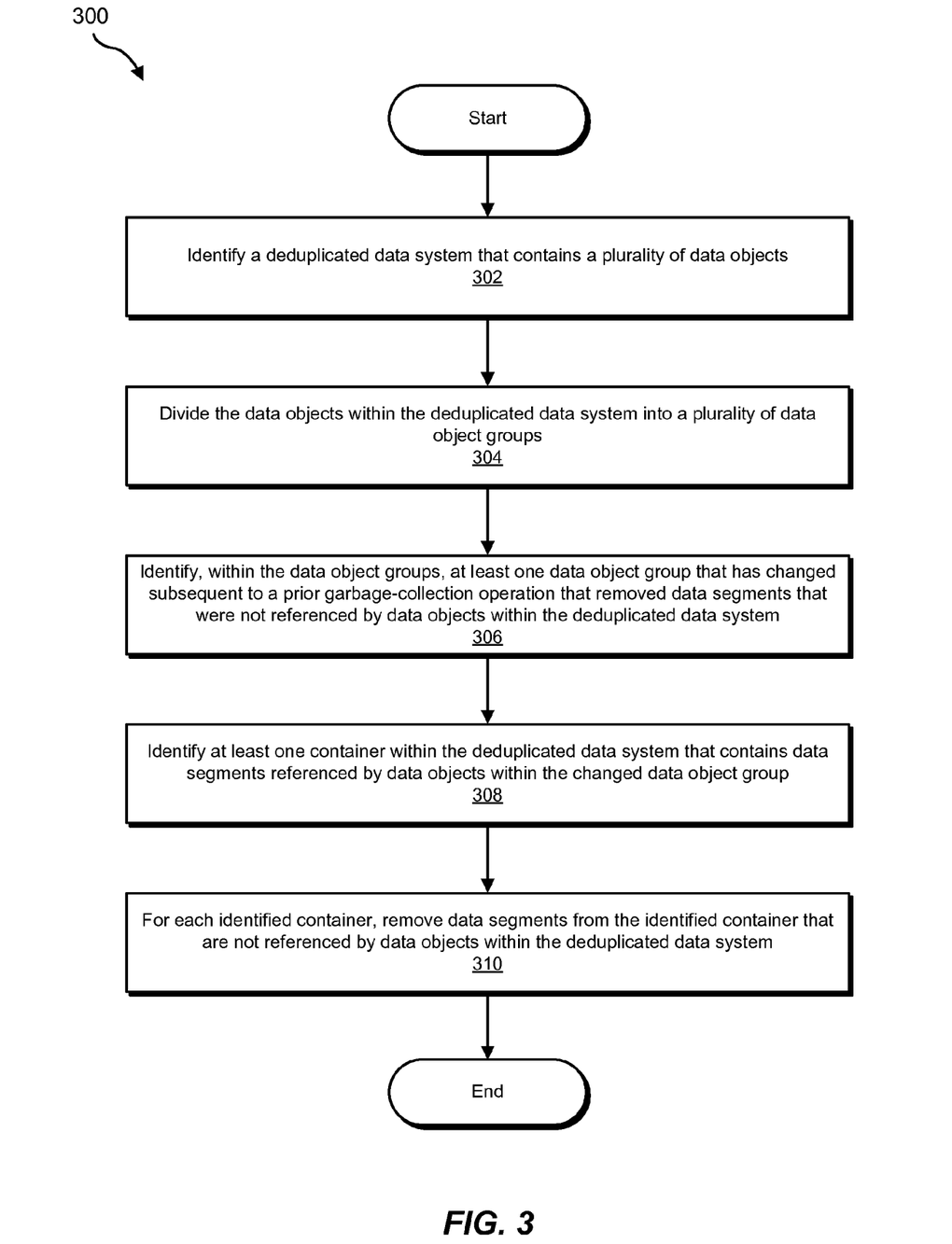
FIG. 3 is a flow diagram of an exemplary method for removing unreferenced data segments from deduplicated data systems.

FIG. 3 is a flow diagram of an exemplary computer-implemented method 300 for removing unreferenced data segments from deduplicated data systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or system 700 in FIG. 7.

As illustrated in FIG. 3, at step 302 one or more of the systems described herein may identify a deduplicated data system that contains a plurality of data objects. For example, at step 302 identification module 104 from FIG. 1 may, as part of computing system 202 in FIG. 2, identify a deduplicated system 120 containing data objects 222. The term "data object," as used herein, may refer to any collection of data suitable for deduplication, such as a file.

Identification module 104 may perform step 302 in any suitable manner. In one example, identification module 104 may identify the deduplicated data system by reading a configuration file associated with the deduplicated data system. Additionally or alternatively, identification module 104 may identify the deduplicated data system by identifying (e.g., intercepting, receiving, or retrieving) a request to remove unreferenced data segments from the deduplicated data system. In some contexts, identification module 104 may be an extension and/or a component of the deduplicated data system, and may implicitly identify the deduplicated data system simply through the context in which it is executing.

At step 304, one or more systems described herein may divide the data objects within the deduplicated data system into a plurality of data object groups (e.g., distribute the data objects into groups). For example, at step 304 grouping module 106 in FIG. 1 may, as part of computing system 202 in FIG. 2, divide data objects 222 into a plurality of data object groups.

Grouping module 106 may divide the data objects into data object groups using a variety of differing methods. In one example, grouping module 106 may randomly distribute the data objects among the data object groups. In another example, grouping module 106 may group together related data objects (e.g., data objects that are likely to undergo changes in concert). If data objects that are likely to undergo changes at or near the same time are grouped together, the methods and systems described herein may have fewer containers to analyze during mark-and-sweep operations, thereby potentially saving computing resources. In some examples, grouping module 106 may determine that certain data objects are related by determining that the data objects are managed by the same application. In other examples, grouping module 106 may determine that data objects are related because of their original placement in a directory structure.

In some contexts, the deduplicated data system may operate on backed-up data. In these contexts, grouping module 106 may divide the data objects among the data object groups by identifying a plurality of backups that include the data objects and assigning the backups to the various data object groups. Grouping data objects by backup may increase the likelihood that data objects in a given group are more likely to undergo changes at or near the same time.

Returning to FIG. 3, at step 306 one or more of the systems described herein may identify, within the data object groups, at least one data object group that has changed subsequent to a prior garbage-collection operation that removed data segments that were not referenced by data objects within the deduplicated data system. For example, at step 306 monitoring module 108 from FIG. 1 may, as part of computing system 202 in FIG. 2, identify each data object group that has changed subsequent to a prior garbage-collection operation that removed some of data segments 224 that were not referenced by data objects 222 within the deduplicated data system. As used herein, the term "data segment" may refer to a segment of data, a block of data, or any other suitable unit of data used for data deduplication. As used herein, the term "garbage-collection operation" may refer to any operation for deleting unreferenced data segments and/or recovering storage space by removing and/or helping to remove unreferenced data segments.

Figure 4:
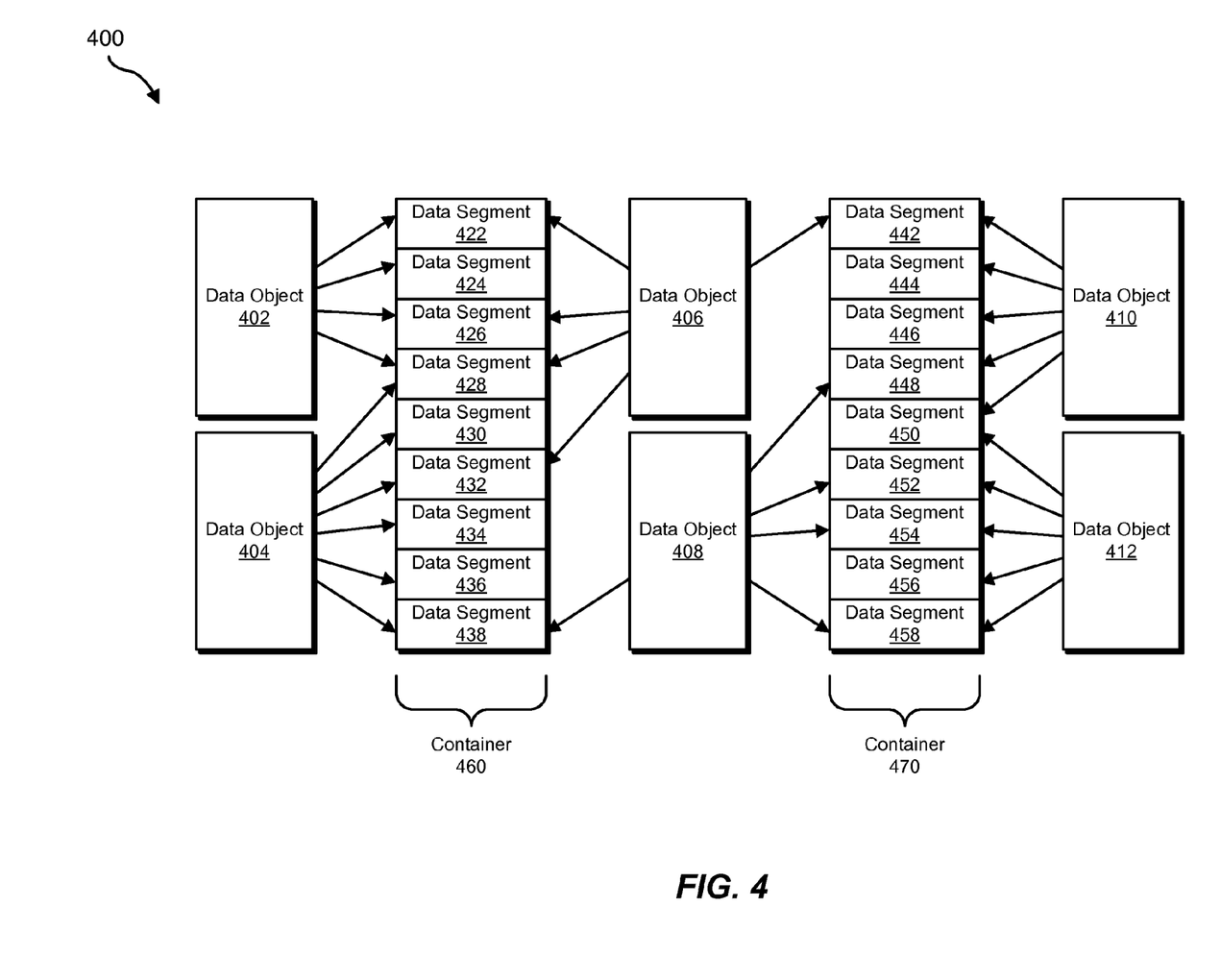
FIG. 4 is a block diagram of an exemplary deduplicated data system.
Figure 5:
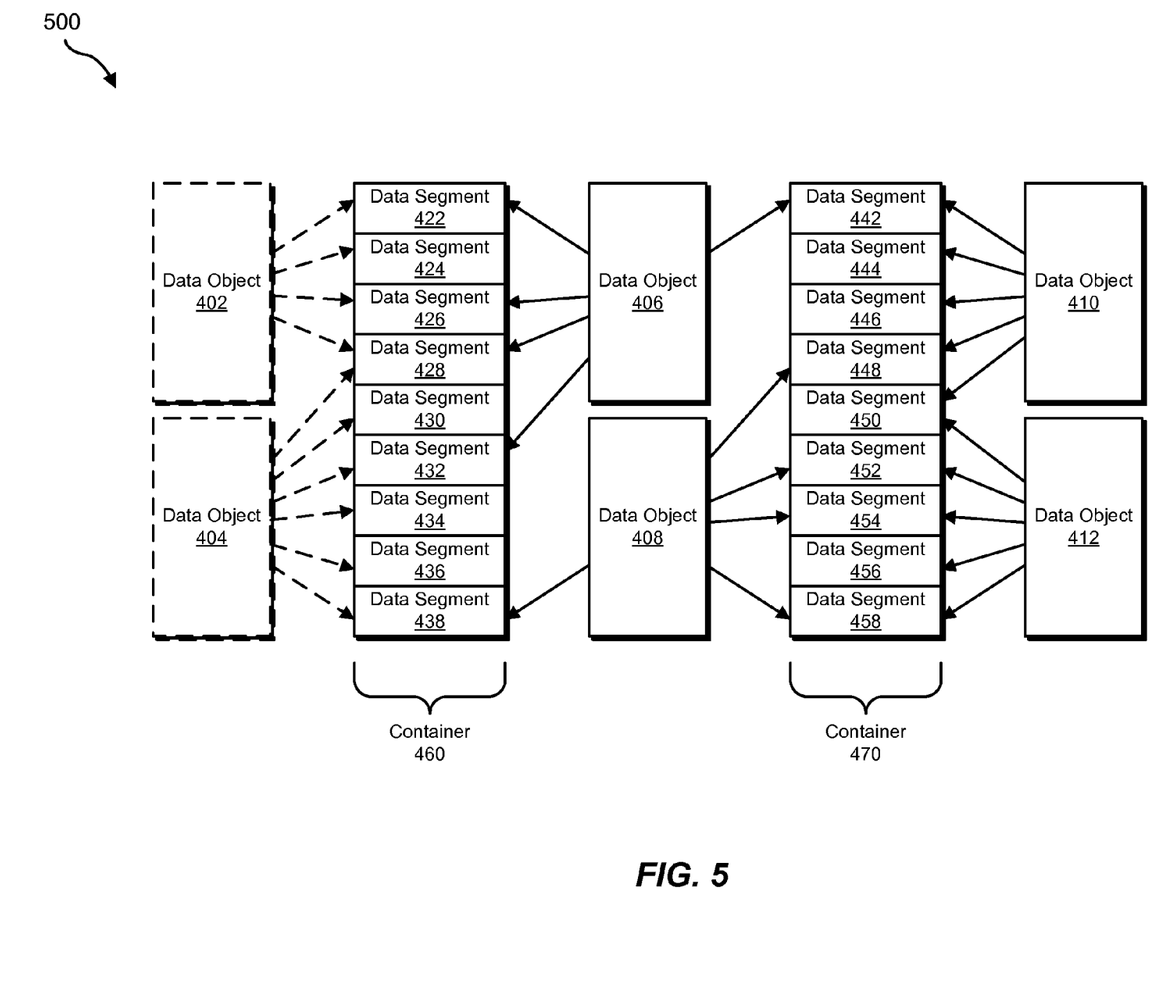
FIG. 5 is a block diagram of an exemplary deduplicated data system.

By way of example and to further illustrate the description of the steps in FIG. 3, FIG. 4 shows an exemplary deduplicated data system 400. As illustrated in FIG. 4, exemplary deduplicated data system 400 may include data objects 402-412. Each of these data objects may include references to data segments (e.g., some of data segments 422-458). For example, data object 402 may include references to data segments 422, 424, 426, and 428. Data segments 422-458 may be organized into, stored in, or allocated to containers (e.g., containers 460 and 470). For example, data segments 422-438 may be stored in container 460 and data segments 442-458 may be stored in container 470.

Some data segments may be referenced by only one data object (such as data segment 424, which is only referenced by data object 402). Other data segments may be referenced by more than one data object (such as data segment 428, which is referenced by data objects 402, 404, and 406). For example, in the example illustrated in FIG. 5 (which is an illustration of exemplary deduplicated data system 400 in a different state), data objects 402 and 404 may have been deleted. This operation may leave some, but not all, of the data segments included by data objects 402 and 404 unreferenced. For example, data object 402 may have originally referenced data segments 422, 424, 426, and 428. After removing data object 402, data segments 422, 426, and 428 may still be referenced by at least one data object (in this case, data object 406), while data segment 424 may not be referenced by any data object and should therefore be deleted to recover storage space on the deduplicated data system.

Monitoring module 108 may perform step 306 in FIG. 3 in a variety of ways. In one example, monitoring module 108 may identify a data object group as changed if a data object has been added to the data object group (e.g., if the data object has been added to the deduplicated data system and placed into the data object group), if a data object has been removed from the data object group (e.g., if the data object has been deleted from the deduplicated data system), and/or if a data object within the data object group has changed (e.g., if the data object is changed to reference different data segments). Using the example described above and illustrated in FIGS. 4-5, the deletion of data objects 402 and 404 may constitute changes to a data object group to which they belong (or to their respective data object groups, if they belong to different data object groups). The data object group of data objects 402 and 404 may therefore represent a changed data object group.

Monitoring module 108 may identify a data object group that has changed subsequent to a prior garbage-collection operation in a variety of ways. For example, monitoring module 108 may monitor the plurality of data object groups for changes (by, e.g., intercepting changes to the deduplicated data system and then identifying a data object group that is affected). Additionally or alternatively, monitoring module 108 may read a log file that identifies changes to data objects and/or data object groups within the deduplicated data system.

Returning to FIG. 3, at step 308 one or more of the systems described herein may identify at least one container within the deduplicated data system that contains data segments referenced by data objects within the changed data object group. For example, at step 308 targeting module 110 from FIG. 1 may, as part of computing system 202 in FIG. 2, identify a container within containers 226 that contains one or more data segments 224 that are referenced by data objects within the changed data object group. As used herein, the term "container" may refer to any data structure, storage system, and/or location that stores, contains, includes, and/or points to a subset of data segments.

Targeting module 110 may perform step 308 in any suitable manner. For example, targeting module 110 may identify a container that contains data segments referenced by data objects within a changed data object group by maintaining, for each data object group, a list of containers that contain data segments referenced by data objects within the data object group. Targeting module 110 may then reference the list of containers for the changed data object group. As will be described in greater detail below, by identifying containers that contain data segments referenced by data objects within each changed data object group, targeting module 110 may identify containers that should be subjected to various mark-and-sweep operations.

At step 310, one or more of the systems described herein may remove data segments from the identified container (e.g., for each identified container) that are not referenced by data objects within the deduplicated data system. For example, at step 310 mark-and-sweep module 112 from FIG. 1 may, as part of computing system 202 in FIG. 2, remove those data segments from the identified container that are not referenced by any of data objects 222.

Mark-and-sweep module 112 may perform step 310 in any suitable manner. In one example, mark-and-sweep module 112 may remove unreferenced data segments from the identified container by performing a mark-and-sweep operation on the container. For example, mark-and-sweep module 112 may mark each referenced data segment in the identified container for each data object group and then remove unmarked data segments from the identified container.

Mark-and-sweep module 112 may mark each unreferenced data segment in the identified container for each data object group in a number of ways. For example, mark-and-sweep module 112 may create a map of referenced data segments in the identified container for each data object group.

Figure 6:
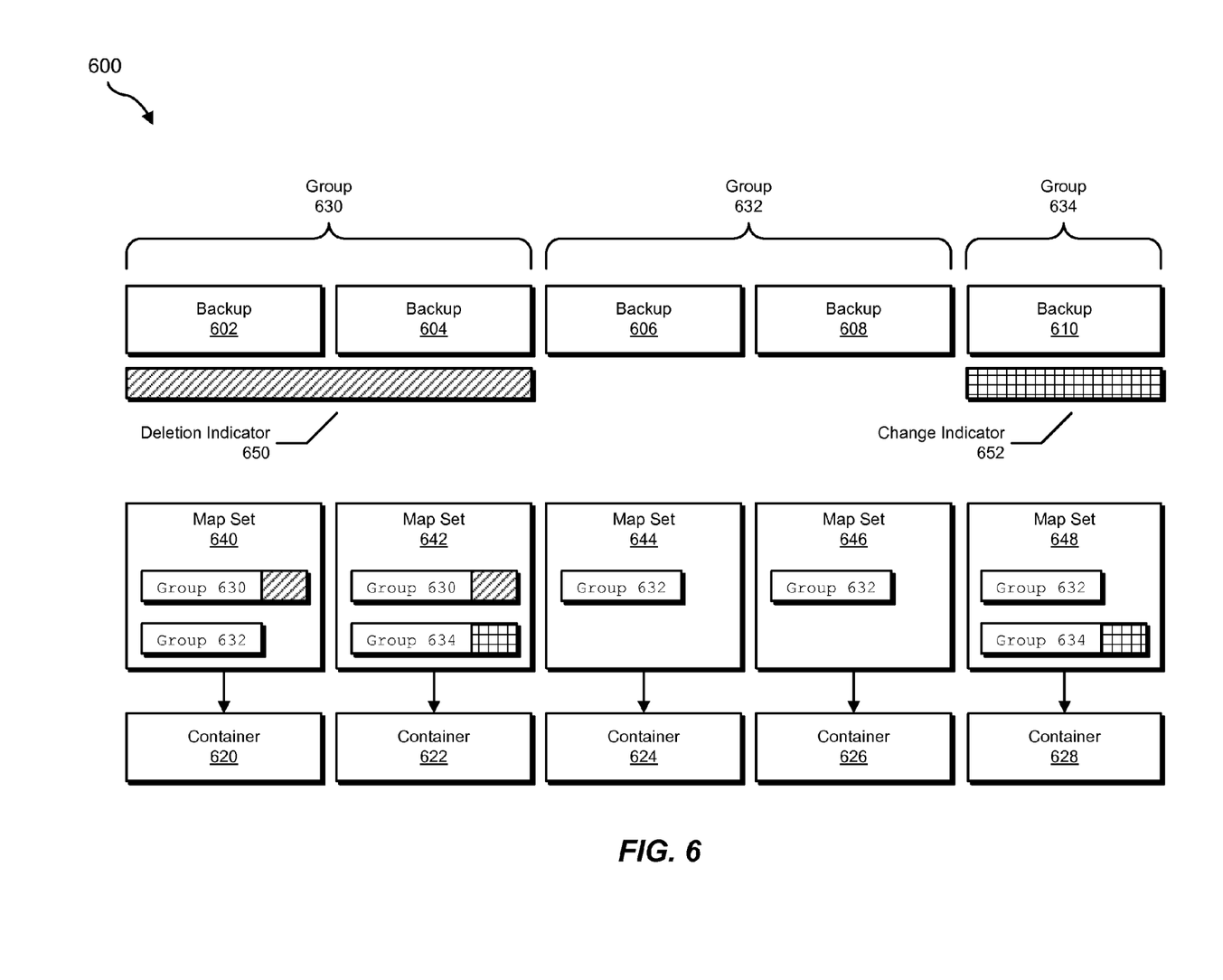
FIG. 6 is a block diagram of an exemplary deduplicated data system.

By way of example and to further illustrate the description of the steps in FIG. 3, FIG. 6 shows an exemplary deduplicated data system 600. As illustrated in FIG. 6, exemplary deduplicated data system 600 may include backups 602-610. Each backup may include data objects that have been backed up and deduplicated. The data segments of these data objects may be stored in containers 620-628. Backups 602-610 may be (as described above with reference to step 304) divided into data object groups. As illustrated in this figure, backups 602 and 604 may be placed in group 630, backups 606 and 608 may be placed in group 632, and backup 610 may be placed in group 634.

Map sets 640-648 may contain maps of referenced data segments for each data object group that contains data objects that reference data segments contained within their respective containers. For example, container 620 may include data segments referenced by data objects included in groups 630 and 632. Accordingly, map set 640 may include maps of data segments in container 620 referenced by data objects within groups 630 and 632 (e.g., one map for each group).

Returning to the exemplary operation of mark-and-sweep module 112 described above, mark-and-sweep module 112 may also merge each map of referenced data segments in the identified container into a comprehensive map for the identified container. For example, if any map within a map set of the container has marked a data segment as referenced, then mark-and-sweep module 112 may mark the data segment as referenced in the comprehensive map for the container. Using the example illustrated in FIG. 6, mark-and-sweep module 112 may create two maps in map set 640: a map for data segments of container 620 referenced by data objects in group 630 and a map for data segments of container 620 referenced by data objects in group 632. Mark-and-sweep module 112 may then merge the map for group 630 and the map for group 632 into a comprehensive map for data segments of container 620 referenced by data objects.

Returning to step 310, as mentioned earlier mark-and-sweep module 112 may remove unmarked data segments from the identified container. In some examples, mark-and-sweep module 112 may only perform such a sweep operation upon determining that at least one changed data object group experienced a change that potentially dereferenced an affected data segment in the identified container. The sort of change that may potentially dereference a data segment in a container may include a variety of changes. For example, the change may include a deletion of a data object from the changed data object group and/or a modification of a data object within the changed data object group.

Mark-and-sweep module 112 may use any suitable method to determine that a changed data object group experienced a change that potentially dereferenced an affected data segment in the identified container. For example, mark-and-sweep module 112 may consult an indicator for the changed data object group to determine the type of change that the data object group underwent. Using the example illustrated in FIG. 6, monitoring module 108 may have observed that a data object in backup 602 was removed. Consequently, monitoring module 108 may have added a deletion indicator 650 to group 630. In this example, mark-and-sweep module 112 may identify deletion indicator 650 and therefore perform a sweep operation (by, e.g., removing unreferenced data segments) on each container with a map for group 630 (e.g., containers 620 and 622). Group 634 may be associated with a change indicator 652, which may indicate a non-deletion change to group 634 (e.g., an addition of a data object to 634). Group 634 may therefore not cause mark-and-sweep module 112 to perform a sweep operation on containers that happen to include data segments referenced by data objects included in group 634.

Returning to step 310, in some embodiments mark-and-sweep module 112 may only check identified containers for unreferenced data segments. Using the above example, the identified containers may include containers 620, 622, and 628 since these containers may contain data segments referenced by data objects within changed data object groups (i.e., groups 630 and 634). By only checking identified containers for unreferenced data segments (by, e.g., only performing mark operations on data segments of the identified containers), mark-and-sweep module 112 may save computing resources. As described above, mark-and-sweep module 112 may restrict its sweep operations to containers with data segments of data object groups that experienced at least one change that potentially dereferenced at least one data segment. Since, according to some embodiments, identified containers may include all containers with potential changes, mark-and-sweep module 112 may, in some embodiments, check only identified containers for at least one change that potentially dereferenced at least one data segment (e.g., mark-and-sweep module 112 may only check for potentially dereferencing changes in containers with changes of some sort).

As an additional example of how the systems and methods described herein may operate, map sets 640-648 in FIG. 6 may include mark results (e.g., marking maps for data segments) for each group within each container. The mark results may include bitmaps that identify a data segment within a given container that is used by data objects within a given group. In a single mark-and-sweep cycle, the systems described herein may mark data segments for each changed group (e.g., groups 630 and 634). Since groups 630 and 634 may have changed, these systems may clear old mark results for groups 630 and 634 (e.g., the maps for groups 630 and 634 for each container). These systems may then generate new mark results for groups 630 and 634 for all containers that have data segments used by data objects in groups 630 and 634 (e.g., containers 620 and 622 for group 630 and containers 622 and 628 for group 634).

During this mark operation, the systems described herein may track all containers that are marked from groups that have had data objects deleted (e.g., containers 620 and 622 marked from group 630). These systems may then put these containers into a sweep list. In this example, only containers in the sweep list may have data segments removed since only these containers may be used by groups that have data objects deleted. The systems described herein may then sweep the containers in the sweep list. To sweep the containers, these systems may merge the mark results for all groups in the container. If a data segment is not marked as referenced in the merged mark results, the systems described herein may remove the data segment.

As detailed above, by focusing mark-and-sweep procedures on containers that include data segments from data objects groups that have undergone changes that could lead to unreferenced data segments, the systems and methods described herein may effectively reduce the amount of computing resources required to locate and delete unreferenced data segments. Moreover, these systems and methods may provide a scalable solution to deleting unreferenced data segments, inasmuch as the resources required to perform these tasks on a deduplicated data system may be approximately proportional to the size of the deduplicated data system. At the same time, these systems and methods may retain the advantages that traditional mark-and-sweep approaches have over bilateral referencing approaches.

Figure 7:
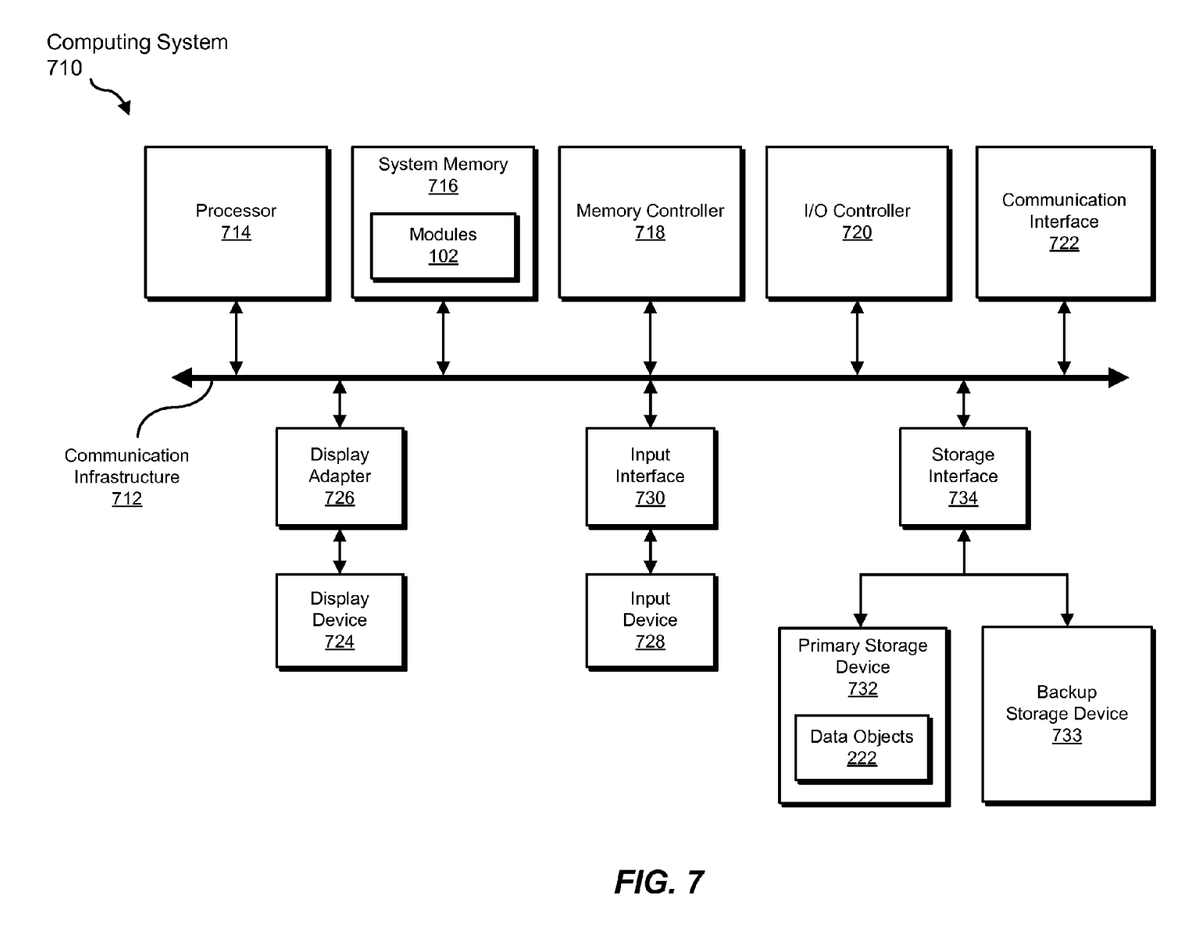
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, dividing, adding, monitoring, marking, removing, creating, merging, determining, and/or checking steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an input/output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, dividing, adding, monitoring, marking, removing, creating, merging, determining, and/or checking.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, dividing, adding, monitoring, marking, removing, creating, merging, determining, and/or checking steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, dividing, adding, monitoring, marking, removing, creating, merging, determining, and/or checking steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, dividing, adding, monitoring, marking, removing, creating, merging, determining, and/or checking steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, data objects 222 from FIG. 2 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, dividing, adding, monitoring, marking, removing, creating, merging, determining, and/or checking steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
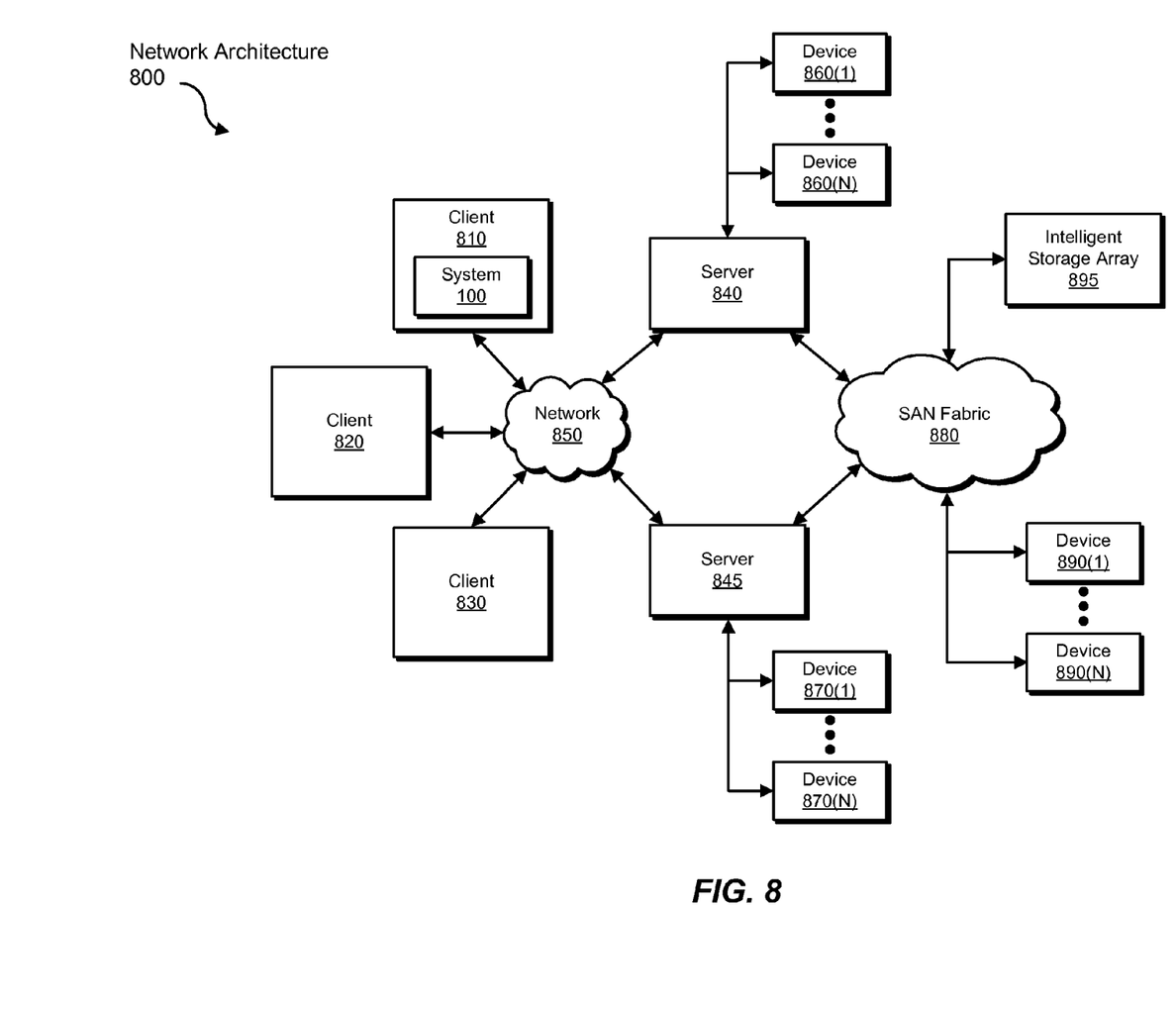
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, dividing, adding, monitoring, marking, removing, creating, merging, determining, and/or checking steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for removing unreferenced data segments from deduplicated data systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a deduplicated data system into an efficient deduplicated data system by reducing the amount of computing resources necessary to remove unreferenced data segments from the deduplicated data system. In another example, one or more of the modules described herein may transform a deduplicated data system by removing unreferenced data segments from the deduplicated data system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for removing unreferenced data segments from deduplicated data systems, the method comprising:
    identifying a deduplicated data system that contains a plurality of data objects, wherein the deduplicated data system reduces redundant data by only storing a single instance of each data segment referenced by the data objects;
    dividing the data objects within the deduplicated data system into a plurality of data object groups;
    identifying, within the data object groups, at least one data object group that has changed subsequent to a prior garbage-collection operation that removed data segments that were not referenced by data objects within the deduplicated data system;
    identifying at least one container within the deduplicated data system that contains data segments referenced by data objects within the changed data object group;
    for each identified container, removing data segments from the identified container that are not referenced by data objects within the deduplicated data system;
    wherein the method is performed by a computing device comprising at least one processor.

2. The computer-implemented method of claim 1, wherein identifying the changed data object group comprises identifying a data object group with at least one of:
    an added data object;
    a removed data object;
    a changed data object.

3. The computer-implemented method of claim 1, wherein dividing the data objects into the plurality of data object groups comprises:
    identifying a plurality of backups comprising the plurality of data objects;
    adding at least one backup from the plurality of backups to each data object group.

4. The computer-implemented method of claim 1, wherein removing unreferenced data segments from the identified container comprises:
    marking each referenced data segment in the identified container for each changed data object group;
    removing unmarked data segments from the identified container.

5. The computer-implemented method of claim 4, wherein marking each referenced data segment in the identified container comprises creating a map of referenced data segments in the identified container for each changed data object group.

6. The computer-implemented method of claim 5, further comprising merging each map of referenced data segments in the identified container into a comprehensive map for the identified container.

7. The computer-implemented method of claim 4, wherein removing the unmarked data segments from the identified container comprises determining that at least one changed data object group experienced a change that potentially dereferenced an affected data segment in the identified container.

8. The computer-implemented method of claim 7, wherein the change that potentially dereferenced the affected data segment in the identified container comprises at least one of:
    deletion of a data object from the changed data object group that potentially dereferenced the affected data segment;
    modification of a data object within the changed data object group that potentially dereferenced the affected data segment.

9. The computer-implemented method of claim 1, wherein removing unreferenced data segments from the identified container comprises checking only identified containers for unreferenced data segments.

10. The computer-implemented method of claim 9, wherein checking only identified containers for unreferenced data segments comprises checking only identified containers for at least one change that potentially dereferenced at least one data segment.

11. The computer-implemented method of claim 1, wherein identifying at least one data object group that has changed comprises monitoring the plurality of data object groups for changes.

12. A system for removing unreferenced data segments from deduplicated data systems, the system comprising:
    an identification module programmed to identify a deduplicated data system that contains a plurality of data objects, wherein the deduplicated data system reduces redundant data by only storing a single instance of each data segment referenced by the data objects; a grouping module programmed to divide the data objects within the deduplicated data system into a plurality of data object groups;

a monitoring module programmed to identify, within the data object groups, at least one data object group that has changed subsequent to a prior garbage-collection operation that removed data segments that were not referenced by data objects within the deduplicated data system;

a targeting module programmed to identify at least one container within the deduplicated data system that contains data segments referenced by data objects within the changed data object group;

a mark-and-sweep module programmed to remove, for each identified container, data segments from the identified container that are not referenced by data objects within the deduplicated data system;

at least one processor configured to execute the identification module, the grouping module, the monitoring module, the targeting module, and the mark-and-sweep module.

13. The system of claim 12, wherein the monitoring module is programmed to identify the changed data object group by identifying a data object group with at least one of:
   an added data object;
   a removed data object;
   a changed data object.

14. The system of claim 12, wherein the grouping module is programmed to divide the data objects into the plurality of data object groups by:
   identifying a plurality of backups comprising the plurality of data objects;
   adding at least one backup from the plurality of backups to each data object group.

15. The system of claim 12, wherein the mark-and-sweep module is programmed to remove unreferenced data segments from the identified container by:
   marking each referenced data segment in the identified container for each changed data object group;
   removing unmarked data segments from the identified container.

16. The system of claim 15, wherein the mark-and-sweep module is programmed to mark each referenced data segment in the identified container by creating a map of referenced data segments in the identified container for each changed data object group.

17. The system of claim 16, wherein the mark-and-sweep module is further programmed to merge each map of referenced data segments in the identified container into a comprehensive map for the identified container.

18. The system of claim 15, wherein the mark-and-sweep module is programmed to remove the unmarked data segments from the identified container by determining that at least one changed data object group experienced a change that potentially dereferenced an affected data segment in the identified container.

19. The system of claim 18, wherein the change that potentially dereferenced the affected data segment in the identified container comprises at least one of:
   deletion of a data object from the changed data object group that potentially dereferenced the affected data segment;
   modification of a data object within the changed data object group that potentially dereferenced the affected data segment.

20. A computer-readable-storage medium comprising one or more computer-executable instructions that, when executed by at least one processor of a computing device, cause the computing device to:
   identify a deduplicated data system that contains a plurality of data objects, wherein the deduplicated data system reduces redundant data by only storing a single instance of each data segment referenced by the data objects;
   divide the data objects within the deduplicated data system into a plurality of data object groups;
   identify, within the data object groups, at least one data object group that has changed subsequent to a prior garbage-collection operation that removed data segments that were not referenced by data objects within the deduplicated data system;
   identify at least one container within the deduplicated data system that contains data segments referenced by data objects within the changed data object group;
   for each identified container, remove data segments from the identified container that are not referenced by data objects within the deduplicated data system.

* * * * *